United States Patent
Vahidsafa (10) Patent No.: US 10,248,520 B2
(45) Date of Patent: Apr. 2, 2019

(54) HIGH SPEED FUNCTIONAL TEST VECTORS IN LOW POWER TEST CONDITIONS OF A DIGITAL INTEGRATED CIRCUIT

(71) Applicant: Oracle International Corporation, Redwood City, CA (US)

(72) Inventor: Ali Vahidsafa, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 167 days.

(21) Appl. No.: 15/202,308

(22) Filed: Jul. 5, 2016

(65) Prior Publication Data

US 2017/0091059 A1   Mar. 30, 2017

Related U.S. Application Data (60) Provisional application No. 62/232,804, filed on Sep. 25, 2015.

(51) Int. Cl.
*G06F 11/00*   (2006.01)
*G06F 11/25*   (2006.01)

(52) U.S. Cl.
CPC ................... *G06F 11/25* (2013.01)

(58) Field of Classification Search
CPC .......... G01R 31/31813; G01R 31/3187; G01R 31/2831; G01R 31/2884; G01R 31/3163;
(Continued)

(56) References Cited

U.S. PATENT DOCUMENTS 3,908,099 A * 9/1975 Borbas .................... G06F 11/20
                                                                    379/9
4,310,878 A * 1/1982 Hyatt .................. B60R 16/0373
                                                                    318/608
(Continued)

FOREIGN PATENT DOCUMENTS

EP          0887653 A1    12/1998

OTHER PUBLICATIONS

Lin, "High-Frequency, At-Speed Scan Testing", Sep.-Oct. 2003, IEEE, pp. 17-25 (Year: 2003).*
(Continued)

*Primary Examiner* — Bryce P Bonzo
*Assistant Examiner* — Jeison C Arcos
(74) *Attorney, Agent, or Firm* — Polsinelli PC (57) ABSTRACT

Implementations of the present disclosure involve an apparatus and/or method for conducting an at-speed functional test on a silicon wafer of an integrated circuit. In one embodiment, the method includes utilizing a first clock signal during a first portion of the test and a second clock signal during a second portion. The clock signals are configured such that a first subset of the logic stages of the circuit are tested at-speed by the first portion and a second subset of the logic stages of the circuit are tested at-speed. Further, in one embodiment, the first subset and the second subset comprise all of the logic stages of the circuit design. Through the configuration of the clock signals, the tester may ensure that each stage of the circuit design is tested at-speed such that a more accurate at-speed test result may be obtained in a low current environment.

18 Claims, 6 Drawing Sheets

(58) Field of Classification Search
CPC ......... G01R 31/07314; Y10T 29/49004; Y10T 29/49155
See application file for complete search history.

(56) References Cited

U.S. PATENT DOCUMENTS

| | | | |
|---|---|---|---|
| 4,379,259 A | 4/1983 | Varadi et al. | |
| 4,439,737 A * | 3/1984 | Mattei | H04L 27/2273 329/308 |
| 5,181,191 A | 1/1993 | Farwell | |
| 5,241,266 A * | 8/1993 | Ahmad | G01R 31/2856 714/733 |
| 5,254,942 A | 10/1993 | D'Souza et al. | |
| 5,276,848 A * | 1/1994 | Gallagher | G06F 12/0897 711/121 |
| 5,457,400 A * | 10/1995 | Ahmad | G01R 31/30 324/750.3 |
| 5,481,550 A | 1/1996 | Garcia et al. | |
| 5,524,114 A | 6/1996 | Peng | |
| 5,614,838 A | 3/1997 | Jaber et al. | |
| 5,617,531 A * | 4/1997 | Crouch | G11C 29/006 714/10 |
| 5,701,666 A * | 12/1997 | DeHaven | G01R 1/07314 29/593 |
| 5,732,209 A * | 3/1998 | Vigil | G01R 31/318566 714/30 |
| 5,781,025 A * | 7/1998 | Sachdev | G01R 31/30 326/16 |
| 5,889,936 A | 3/1999 | Chan | |
| 6,161,208 A * | 12/2000 | Dutton | G06F 11/1008 711/118 |
| 6,199,185 B1 | 3/2001 | Ju et al. | |
| 6,286,121 B1 * | 9/2001 | Osawa | G01R 31/318536 714/738 |
| 6,400,129 B1 * | 6/2002 | Yamaguchi | G01R 31/3016 324/76.82 |
| 6,424,926 B1 | 7/2002 | Mak | |
| 6,574,760 B1 | 6/2003 | Mydill | |
| 6,832,173 B1 * | 12/2004 | Starr | H03L 7/0891 327/157 |
| 6,914,834 B2 | 7/2005 | Mayer | |
| 6,975,954 B2 | 12/2005 | Mak et al. | |
| 7,002,358 B2 * | 2/2006 | Wyatt | G01R 29/26 324/613 |
| 7,127,018 B2 * | 10/2006 | Yamaguchi | G01R 31/31709 375/371 |
| 7,203,229 B1 * | 4/2007 | Ishida | G01R 29/26 375/226 |
| 7,240,266 B2 | 7/2007 | Farmer et al. | |
| 7,308,625 B1 * | 12/2007 | Wingen | G01R 31/3016 324/76.35 |
| 7,317,309 B2 * | 1/2008 | Yamaguchi | G01R 23/16 324/76.19 |
| 7,460,592 B2 * | 12/2008 | Yamaguchi | G01R 31/31709 375/224 |
| 7,473,568 B2 | 1/2009 | Co et al. | |
| 7,590,902 B1 * | 9/2009 | Tabatabaei | G01R 31/318508 714/724 |
| 7,793,179 B2 | 9/2010 | Sul | |
| 7,954,023 B2 * | 5/2011 | Otsuga | H03K 19/0016 714/726 |
| 7,960,190 B2 | 6/2011 | Moret et al. | |
| 8,145,963 B2 | 3/2012 | Fukuda et al. | |
| 8,155,174 B2 * | 4/2012 | Kim | G01R 31/31725 375/224 |
| 8,531,196 B1 * | 9/2013 | Shelat | G01R 31/31725 324/750.3 |
| 8,560,903 B2 | 10/2013 | Wang et al. | |
| 2001/0015773 A1 * | 8/2001 | Eldridge | G01R 1/07307 348/765 |
| 2001/0040829 A1 * | 11/2001 | Arimoto | G11C 29/48 365/189.02 |
| 2001/0044918 A1 * | 11/2001 | Sato | G11C 7/18 714/718 |
| 2001/0047496 A1 * | 11/2001 | Hidaka | G11C 29/48 714/5.1 |
| 2002/0011827 A1 * | 1/2002 | Ishida | G01R 31/318342 324/71.5 |
| 2003/0101395 A1 * | 5/2003 | Man | G01R 31/318533 714/726 |
| 2003/0149922 A1 * | 8/2003 | Lai | G01R 31/317 714/724 |
| 2005/0023656 A1 * | 2/2005 | Leedy | B81B 7/02 257/678 |
| 2005/0055615 A1 * | 3/2005 | Agashe | G01R 31/318552 714/727 |
| 2006/0107145 A1 * | 5/2006 | Athavale | G01R 31/318594 714/727 |
| 2006/0123186 A1 * | 6/2006 | Loh | G06F 9/30101 711/103 |
| 2006/0280150 A1 * | 12/2006 | Jha | G06F 9/44589 370/338 |
| 2007/0061644 A1 * | 3/2007 | Birmiwal | G01R 31/318583 714/726 |
| 2007/0288822 A1 * | 12/2007 | Lin | G01R 31/318357 714/741 |
| 2008/0023700 A1 * | 1/2008 | Gschwind | G01R 31/318569 257/48 |
| 2008/0071513 A1 * | 3/2008 | Chickermane | G01R 31/31721 703/15 |
| 2009/0055698 A1 * | 2/2009 | Resnick | G11C 29/16 714/733 |
| 2009/0089632 A1 * | 4/2009 | Morein | G11C 29/14 714/720 |
| 2009/0192753 A1 | 7/2009 | Salmon | |
| 2009/0210763 A1 * | 8/2009 | Eckelman | G01R 31/318536 714/731 |
| 2010/0144069 A1 * | 6/2010 | Johnson | G01R 31/2889 438/17 |
| 2010/0151598 A1 * | 6/2010 | Moret | H01L 22/14 438/15 |
| 2011/0264971 A1 * | 10/2011 | Bahl | G01R 31/318594 714/731 |
| 2012/0030532 A1 * | 2/2012 | Jain | G01R 31/318547 714/726 |
| 2012/0047413 A1 * | 2/2012 | Chung | G01R 31/318555 714/731 |
| 2012/0057214 A1 * | 3/2012 | Tsuboi | G02B 26/0841 359/221.2 |
| 2012/0110382 A1 * | 5/2012 | Tang | G06F 11/263 714/32 |
| 2012/0173943 A1 * | 7/2012 | Cesari | G01R 31/318552 714/731 |
| 2012/0223418 A1 * | 9/2012 | Stowers | C23C 18/06 257/632 |
| 2013/0159803 A1 * | 6/2013 | Pakbaz | G01R 31/31813 714/733 |
| 2014/0164860 A1 * | 6/2014 | Kim | G01R 31/318536 714/731 |
| 2014/0274000 A1 * | 9/2014 | Gosselin | H04M 3/4365 455/415 |
| 2015/0377960 A1 * | 12/2015 | Vahidsafa | G01R 31/31922 714/728 |
| 2016/0131711 A1 * | 5/2016 | Vahidsafa | G01R 31/31726 324/762.03 |

OTHER PUBLICATIONS

Rearick, "Calibrating Clock Stretch During AC Scan Testing", 2005, IEEE, pp. 1-8 (Year: 2005).*

Malinoski, "A Test Site Thermal Control System for At-Speed Manufacturing Testing", 1998, International Test Conference, pp. 119-129 (Year: 1998).*

Ravikumar, "At-Speed Transition Fault Testing With Low Speed Scan Enable", 2005, IEEE VLSI Test Symposium (VTS'05), pp. 1-6 (Year: 2005).*

(56) References Cited

OTHER PUBLICATIONS

Swanson, "At-speed testing made easy", Jun. 3, 2004, EE-Times, pp. 1-7 (Year: 2004).*
Marinissen, "Testing 3D Chips Containing Through-Silicon Vias", 2009, IEEE, pp. 1-11 (Year: 2009).*
Ravikumar et al., "Test Strategies for Low Power Devices," DOI: 10.1109/DATE.2008.4484765 • Source: *IEEE Xplore* Conference: Design, Automation and Test in Europe, 2008. DATE '08.
Lin et al., "An On-Chip Clock Controller for Testing Fault in System on Chip," Atlantis Press, Paris, France 2001.

* cited by examiner

HIGH SPEED FUNCTIONAL TEST VECTORS IN LOW POWER TEST CONDITIONS OF A DIGITAL INTEGRATED CIRCUIT

RELATED APPLICATIONS

This application claims priority under 35 U.S.C. § 119(e) from U.S. Patent Application No. 62/232,804, filed Sep. 25, 2015, titled "HIGH SPEED FUNCTIONAL TEST VECTORS IN LOW POWER TEST CONDITIONS OF A DIGITAL INTEGRATED CIRCUIT," the entire contents of each are incorporated herein by reference for all purposes.

FIELD OF THE DISCLOSURE

Aspects of the present invention relate to computing systems and, more particularly, aspects of the present invention involve an apparatus and/or method for performing high speed functional testing of an integrated circuit in low to ultra-low power test conditions.

BACKGROUND

It is often desirable to improve the efficiency and comprehensiveness of manufacturing testing of computer components. To ensure fast and reliable operation of a computer, manufacturing testing of each part must include some form of speed testing to show that the component is operating within the specified timing parameters.

One type of testing performed during semiconductor fabrication is a wafer test. Wafer tests are conducted on a wafer of a semiconductor chip prior to the wafer being sent to die preparation. The wafer includes all of the individual integrated circuits of the chip design such that functional defects of the chip may be detected through the wafer test. If a defect of the die is determined through the wafer test, the die may not be mounted on a package, thus saving the costs associated with packaging.

To perform the wafer test, the integrated circuit may be connected to a wafer prober. In general, the wafer prober provides the power to run the test and utilizes several probes to obtain the results of the test. However, in many instances, the wafer prober cannot provide the chip design of the wafer with enough current to conduct at-speed testing of the chip. In other words, the chip design may require a certain amount of current to perform at the designed operating speed of the chip. This current level is often not available during the wafer test as the wafer prober (or other wafer testing devices) is not capable of providing the necessary current. As such, many wafer tests are conducted at clock speed that is far less than the normal operating speed of the chip. Other methods for improving the at-speed testing of the wafer include only testing one or more portions of the chip separately in an attempt to improve the clock speed used during the test. However, such solutions are not capable of providing accurate test results at the normal operating speed of the chip design.

It is with these and other issues in mind that various aspects of the present disclosure were developed.

SUMMARY

One implementation of the present disclosure may take the form of a method for functional testing of a microelectronic circuit. The method may include the operations of loading an initial value into the microelectronic circuit through one or more inputs to the microelectronic circuit, the microelectronic circuit comprising a plurality of logic stages, conducting a first portion of the functional test by transmitting a first clock signal to the microelectronic circuit, the first clock signal comprising one or more pulses of a first clock signal and one or more first delay periods, the first clock signal configured to test a first subset of the plurality of logic stages at an operational frequency of the microelectronic circuit, and storing a result of the first portion of the functional test in a memory device. The method may further include the operations of initializing the microelectronic circuit by reloading the initial value into the microelectronic circuit through the one or more inputs, conducting a second portion of the functional test by transmitting a second clock signal to the microelectronic circuit, the second clock signal comprising at least one offsetting clock pulse, one or more pulses of a second clock signal and one or more second delay periods, the second clock signal configured to test a second subset of the plurality of logic stages at the operational frequency of the microelectronic circuit, the second subset of the plurality of logic stages different than the first subset, and comparing the stored result from the first portion and a result from the second portion to an expected result.

Another implementation of the present disclosure may take the form of a computer system a testing device for conducting testing of circuit designs and a microelectronic circuit embodied on a silicon wafer and coupled to the testing device, the microelectronic circuit comprising a plurality of logic stages. The testing device electrically connects to the microelectronic circuit and may be configured to load an initial test value into the microelectronic circuit through one or more inputs to the microelectronic circuit, initiate a first portion of an at-speed test by transmitting a first clock signal to the microelectronic circuit, the first clock signal comprising one or more pulses of a first clock signal and one or more first delay periods, the first clock signal configured to test a first subset of the plurality of logic stages at an operational frequency of the microelectronic circuit, and store a result of the first portion of the structural test in a memory device. Further, the testing device may also initialize the microelectronic circuit by reloading the initial test value into the microelectronic circuit through the one or more inputs, conduct a second portion of the at-speed test by transmitting a second clock signal to the microelectronic circuit, the second clock signal comprising at least one offsetting clock pulse, one or more pulses of a second clock signal and one or more second delay periods, the second clock signal configured to test a second subset of the plurality of logic stages at the operational frequency of the microelectronic circuit, the second subset of the plurality of logic stages different than the first subset, and compare the stored result from the first portion and a result from the second portion to an expected result.

DETAILED DESCRIPTION

Implementations of the present disclosure involve an apparatus and/or method for conducting an at-speed functional test on a silicon wafer of an integrated circuit. In one embodiment, the method includes utilizing a first clock signal during a first portion of the test and a second clock signal during a second portion. The clock signals are configured such that a first subset of the logic stages of the circuit are tested at-speed by the first portion and a second subset of the logic stages of the circuit are tested at-speed. Further, in one embodiment, the first subset and the second subset comprise all of the logic stages of the circuit design. Through the configuration of the clock signals, the tester may ensure that each stage of the circuit design is tested at-speed such that a more accurate at-speed test result may be obtained in a low current environment. Testing of a silicon wafer is one such low current environment where the first portion test and the second portion test may be utilized. After completion of the test portions, the results from each portion may be analyzed to determine the performance of the circuit design at the operational speed of the circuit.

In one particular embodiment, the method for conducting at-speed test of a wafer in a low current environment includes providing a series of clock pulses to operate the chip separated by a delay period to allow the charge in the chip to replenish. For example, a series of two clock pulses may be provided to the integrated chip at the operating speed of the chip, followed by a delay period that lasts longer than two clock pulses. After the delay period, another series of two clock pulses may be provided at the operating speed of the chip. In this manner, the chip may be tested and the results analyzed to determine the accuracy of the chip design. Following this first portion of the at-speed test, a second series of clock pulses may be provided to the chip design in a second portion of the test followed by a delay period, similar to the first portion of the test. However, in the second portion, the second series of clock pulses may be offset by one or more clock pulses. By offsetting the second series of clock pulses by one or more clock pulses, the logic stages of the chip design that are not tested at-speed during the first portion of the test (those logic stages of the design that are tested during the delay periods) may be tested at-speed during the second portion of the test. In this manner, the results from the first portion and the second portion may be combined or otherwise analyzed to determine the functional performance of the chip design at-speed as each logic portion of the chip design is tested at-speed in either the first portion or the second portion of the test. Further, by incorporating the delay periods during the portions of the test, the low current environment of the wafer tester is maintained such that a-speed testing of the wafer may occur without significantly increasing the current provided by the wafer tester. Although described above as utilizing two clock cycles to execute the at-speed test, in general any number of clock cycles may be provided to generate the portions of the at-speed test. Further, the delay period of the portions of the test may be any number of at-speed clock cycles.

Figure 1A:
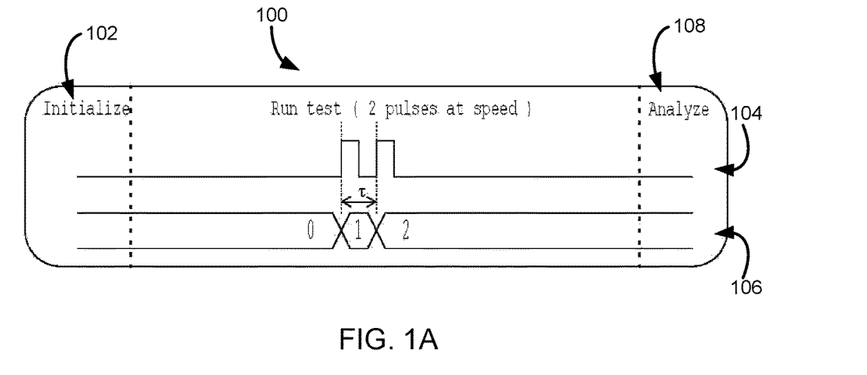
FIG. 1A is a timing diagram illustrating a timing signal used during a scan-based test of a microelectronic circuit.
Figure 1B:
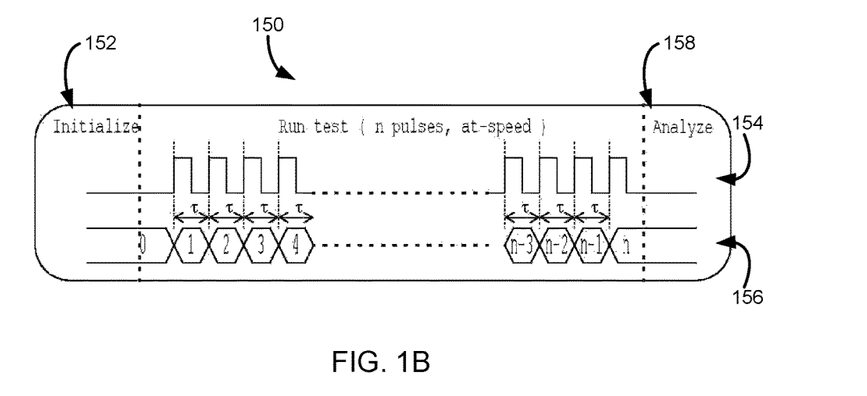
FIG. 1B is a timing diagram illustrating a timing signal used during a functional test of a microelectronic circuit.

FIGS. 1A and 1B illustrate the difference between scan-based testing and functional testing of a microelectronic circuit. In general and shown in the timing diagram of FIG. 1A, scan-based testing begins by loading an initial state into the circuit using the scan inputs of the circuit. The initialization portion of the test is illustrated in FIG. 1A as the "Initialize" portion 102 of the timing diagram 100. Subsequently, a number of clock pulses (illustrated by clock signal 104) are released into the microelectronic circuit to advance the state (illustrated by state signal 106), and then the final state of the microelectronic circuit is extracted through scan outputs of the circuit. The scan out portion of the test is illustrated in FIG. 1A as the "Analyze" portion 108 of the diagram. Subsequently, the final state extracted from the microelectronic circuit is compared by the testing apparatus against an expected value, and a mismatch indicates that the unit-under-test is defective.

Functional testing of a microelectronic circuit is illustrated in the timing diagram 150 of FIG. 1B. Similar to scan-based testing, functional testing includes an initialize portion 152 that loads an initial state into the microelectronic circuit. Further, the functional test may include releasing a number of clock pulses (as seen in clock signal 154) into the circuit to advance the state (as seen in state signal 156), then the final state is extracted out in the analyze portion 158 of the test and compared against an expected value. In general, the difference between scan-based testing and functional testing is in the number of clocks or clock pulses that are released into the microelectronic circuit to advance the internal state. A common case of scan-based testing, generally referred to as "transition test", releases two clock pulses into the microelectronic circuit, as shown in FIG. 1A while functional testing may include releasing thousands or even millions of clock pulses, as shown in FIG. 1B.

In a typical microelectronic circuit, the clocking condition shown in FIG. 1A causes a short spike in the amount of current consumed by the circuit. For a well-designed microelectronic circuit, the high-current spike is absorbed by the capacitances which are designed within the circuit such that there is little significant change in the amount of current which is provided by the external power supplies. For the clocking condition shown in FIG. 1B, however, the high-current condition is not a short spike, but a sustained condition which may require external power supplies to feed a high current to the microelectronic circuit. Further, the amount of sustained current which the testing apparatus can provide to a microelectronic circuit during wafer probe is typically lower than it would be during other testing phases, or during actual use. Consequently, in a typical wafer-probe test suite, functional testing is either performed at low frequency, or excluded entirely.

Thus, in one implementation of the present disclosure, a timing signal may be applied during a wafer test of a microprocessor design. In particular, the wafer prober or tester may apply one or more signals to the wafer under test (and in particular, the chip design of the wafer under test) to activate or otherwise control a clock signal of the chip design. In this manner, the wafer tester utilizes one or more clock circuits of the integrated circuit of the wafer to operate the test of the chip as a clock signal is applied to the chip to run one or more operations of the chip design.

Figure 2:
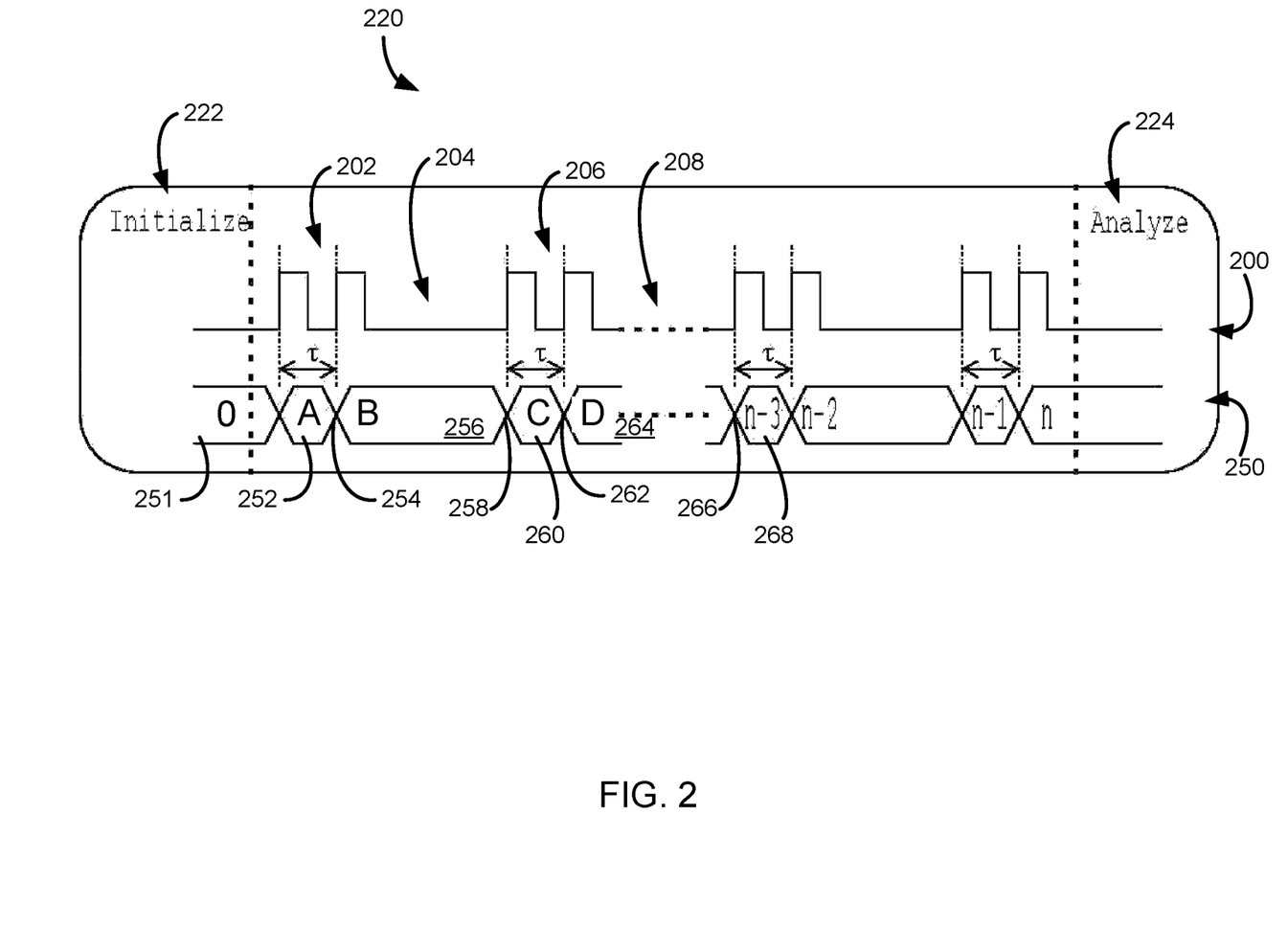
FIG. 2 is a timing diagram illustrating an example of a test clock used during a wafer test of a microprocessor design and a state signal for the circuit during the test.

In one implementation, the timing diagram of FIG. 2 may be applied to the wafer during the wafer test. In general, the timing diagram 220 of FIG. 2 includes the same number of clock pulses and the same ending state as that of the diagram discussed above with reference to FIG. 1B. However, in the diagram 220 of FIG. 2, the clock pulses are released in pairs, and each pair is separated from another pair by an arbitrary amount of time. In general, separation of clock pairs is determined such that the functional testing's overall demand for current is the same or similar to that of "transition test".

As shown in FIG. 2, the clock signal 200 includes a first set of at-speed clock pulses 202 followed by a delay period 204 of more than the number of pulses in the set of at-speed clock pulses. In the example shown, the clock cycles 202 illustrated include two at-speed clock signals. However, it should be appreciated that any number of at-speed clock cycles (such as three consecutive clock cycles or four consecutive clock cycles) may be included in the at-speed clock pulses 202 of the clock signal. Further, the at-speed clock cycles 202 may be initiated by the wafer tester and provided by one or more clock circuits of the chip design under design. As such, the at-speed clock pulses 202 of the timing diagram 220 may be at an operating frequency of the chip design. For example, the chip embodied on the wafer may be designed to operate at a particular clock signal frequency. This frequency may be known or otherwise provided to the wafer tester. The wafer tester may, in turn, transmit one or more signals to the circuit activate the one or more clock circuits of the circuit under test to provide the at-speed clock pulses 202 of the timing diagram 220. The wafer tester may also deactivate or otherwise turn off the clock signal applied to the circuit under test after a number of at-speed clock pulses 202 have been applied to the circuit. The amount of time between the activation and deactivation of the clock signal and the operating frequency of the circuit may determine the number of pulses included in the at-speed clock pulse 202 portion of the test.

Following the at-speed clock pulses 202, the clock signal of the circuit may be deactivated for a delay period 204. The delay period 204, in general, is a period of time in which no clock pulses are applied to the circuit. The length of the delay period 204 may be any length of time and may be discussed in some embodiments as a number of clock pulses. In other words, by considering the frequency of the operating clock signal of the circuit and the length of the delay period 204, the period may be measured by a number of clock pulses that are not applied to the circuit under test.

In general, the delay period 204 is included in the clock signal 200 used for the at-speed testing because the wafer tester may not generate enough current to operate the circuit under test over many at-speed clock pulses. For example, the operation of many integrated circuits at a high operating frequency may quickly dissipate the current and/or power applied to operate the circuit, an effect commonly referred to as voltage or current droop. Thus, such circuits may require high amounts of current or power to operate the circuit in a continuous manner. In low current environments, such as when the circuit is powered by the wafer tester, the circuit may not operate correctly as the current or power in the circuit is dissipated through operation at a faster rate than the current is provided to circuit to replenish the dissipating components of the circuit. To address this, many tests executed in low current environments will pause or delay 204 the at-speed execution of the operations of the circuit to allow the components to regain a charge before the test can resume. As such, a delay period 204 to allow the components of the circuit to recharge is included in the clock signal 220 applied to the circuit under test as the wafer tester may not provide enough current to operate the circuit for the entire length of the test.

Returning to the clock signal 200 of FIG. 2, after the application of a first set of clock cycles 202 and the delay period 204, the wafer tester may initiate the clock circuit of the integrated circuit to repeat a set of at-speed clock cycles 206 and another delay period 208. Further, the wafer tester may continue to apply a series of clock cycles and delay periods for a particular amount of time. In general, the application of the clock cycles 202 and delay periods 204 may be repeated any number of times to test the circuit of the wafer. For example, the wafer test may be configured to apply the clock cycles 202 and the delay period 204 over a time period that is adequate to partially test the circuit embodied on the wafer, including testing many logic stages of the circuit design at-speed.

Although shown in FIG. 2 as including two at-speed clock cycles 202, the wafer tester may be configured to initiate any number of clock cycles. For example, the number of clock cycles applied to the circuit during the at-speed portion of the testing may be three or more clock cycles. In addition, the length of the delay period may be any number of at-speed clock cycles. The specific number of clock cycles of the applied clock cycles and/or the delay period may be any number of clock cycles, as discussed in more detail below.

Also included in the timing diagram 220 of FIG. 2 is a state signal 250 of the electronic circuit under test. In general, an integrated circuit design may be diagrammed as a series of logic stages through which data flows and is processed. For example, data may be loaded or initialized into logic stage 0 251 of the circuit during the initialization phase 222 of the test. Each logic stage of the circuit may include any number of logic components and/or storage components, such as adders, latches, flip-flops, etc. At each leading edge of a clock signal 200 applied to the circuit, the data may flow from one logic stage (such as logic stage 0 251) to the next logic stage (such as logic stage A 252) in the series of logic stages 250. The flow of data from one logic stage to the next in the chain of logic stages is illustrated in FIG. 2 as the transitions 254, 258 between the logic stages. Thus, through the application of the clock signal 200 of FIG. 2 to a circuit under test, data flows through and is processed by the logic components of the stages 250 of the circuit. As should be appreciated, the circuit may include any number of logic stages 250 in addition to that illustrated in FIG. 2.

In the timing diagrams of FIGS. 1A-2, $\tau$ represents the clock period associated with a target test frequency. When two clock pulses are separated by $\tau$, the state transition which occurs on the second pulse is considered an "at-speed" test. As such and as mentioned above, one drawback to the use of the clock signal 200 of FIG. 2 to perform an at-speed test of the circuit is that some transitions between logic stages 250 of the circuit are not performed at the operating speed of the circuit. For example, the application of the clock signal 200 of FIG. 2 to the logic stages 250 of the circuit would only partially test the transitions between the logic stages at the operating speed of the circuit. In particular, the transition 254 from logic stage A 252 to logic stage B 256 may be performed at-speed after the application of the first set of at-speed clock pulses 202. However, the data of the test transitions 258 from logic stage B 256 to logic stage C 260 only after the delay period 204 resulting in the transition occurring not at the operating speed of the circuit. Continuing this example, the transition 262 from logic stage C 260 to logic stage D 264 may occur at-speed (in relation to at-speed clock pulses 206) and so on as the clock signal 200 is applied to the circuit under test.

Figure 3:
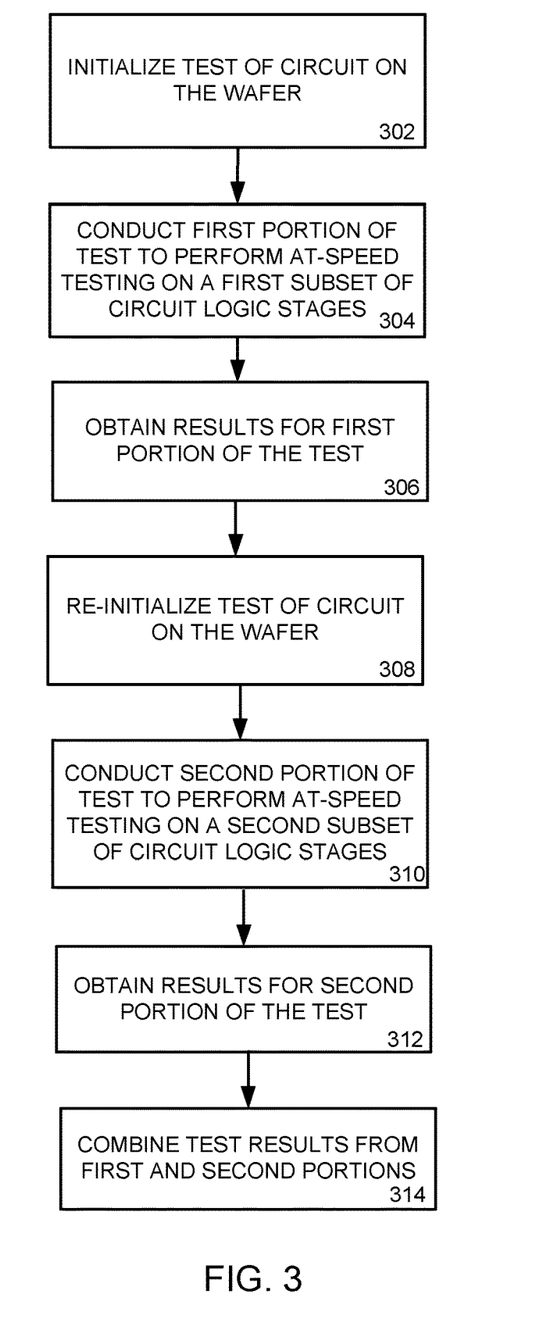
FIG. 3 is a flowchart of a method for conducting a first portion and a second portion of an at-speed test on a circuit wafer.

As described, by utilizing the test clock signal 220 of FIG. 2, some of the transitions between logic stages 250 of the circuit are performed at-speed while other transitions are not due to the delay periods 204, 208 in the clock signal. However, the delay periods 204, 208 may be needed due to the low current environment of the wafer tester. However, through the application of multiple clock signals offset from each other, every transition between logic stages of a circuit under test may be tested at-speed. In particular, FIG. 3 is a flowchart of a method for conducting a first portion and a second portion of an at-speed test on a circuit wafer. In general, the operations of the method 300 may be performed by a testing device, such as a wafer tester to conduct an at-speed test of a circuit embodied on a wafer. In addition, one or more of the operations may be performed by the tester in response to one or more inputs provided to the tester from a testing operator of a wafer test.

In operation 302, the tester initializes the at-speed test in the integrated circuit of the wafer. In this operation, an initial state of one or more logic components of the circuit is generated by loading data into one or more of the logic components. Once the at-speed test is initialized through the loading of data into one or more components, a first portion of the test may be conducted on the circuit in operation 304. In one embodiment, the first portion of the test is performed by controlling the clock signal of the circuit in a manner described above with reference to FIG. 2. In other words, the tester provides one or more control signals to the circuit to generate a clock signal to process the data loaded into the circuit through the initialization stage. Once the clock signal is applied, the data is processed through the various logic stages of the circuit on the wafer at each leading edge of the clock signal.

As described above, the application of the clock signal 200 of FIG. 2 may only at-speed test some of the logic stages 250 of the circuit design. In particular, the clock signal 200 may include one or more delay portions 204, 208 such that transitions of data through the logic stages occurring after the delay portions are not an at-speed operation as these transitions do not occur at the operation frequency of the circuit. Thus, the application of the clock signal 200 of FIG. 2 conducts an at-speed test of a first subset of the logic stages of the circuit design. In operation 306, the tester obtains one or more results of the first portion of the test (during the analyze portion 224 of the test) stored in a memory component of the circuit or the tester. In particular, through the operation of the test, the testing program executed by the circuit may generate a result which is stored in a memory component. In one example, the result is a checksum value that is stored. The checksum value may be compared to an expected checksum value to determine whether the circuit performed accurately during the test. In other words, the generation of the correct checksum value at the end of the test indicates that at least some of the logic stages of the circuit were able to perform accurately at the operational speed of the circuit.

However, as discussed above, only some of the logic stages of the circuit may be tested at-speed during the first portion of the test due to one or more delay periods in the applied clock signal. Thus, a second portion of the test may be executed on the circuit to conduct at-speed testing on the other logic stages of the circuit that were not tested in the first portion. In particular, the tester may re-initialize the circuit in operation 308 to place the circuit in the same state as in the beginning of the first portion of the at-speed test. In operation 310, the second portion of the test is conducted on the circuit to at-speed a second subset of the logic stages of the circuit. As explained in more detail below in relation to FIG. 4, a second clock signal different than the clock signal applied in the first portion of the test may be generated by the tester. Also, the second clock signal may be configured to ensure that the second subset of logic stages transition at the operational speed of the circuit. As such, through the application of the first clock signal in the first portion of the test and the second clock signal in the second portion of the test, each logic stage of the circuit is tested at-speed.

In operation 312, the tester may obtain the results of the second portion of the test. In particular, the tester may again obtain the stored result, such as the checksum value, and compare the result against an expected result of the test. The generation of the correct checksum value at the end of the test indicates that second subset of the logic stages of the circuit was able to perform accurately at the operational speed of the circuit. Further, in operation 314, the tester combines the results of the first portion of the at-speed test and the second portion of the at-speed test. More particularly, the tester may analyze the results of the at-speed test of the first subset of logic stages of the circuit and the results of the at-speed test for the second subset of logic stages to determine if all of the logic stages of the circuit design performed accurately at-speed. Thus, through the operations of the method 300 of FIG. 3, an at-speed test of all of the logic stages of the circuit may be conducted, even in low current environments where clock signals with delay periods are used during the test.

Figure 4:
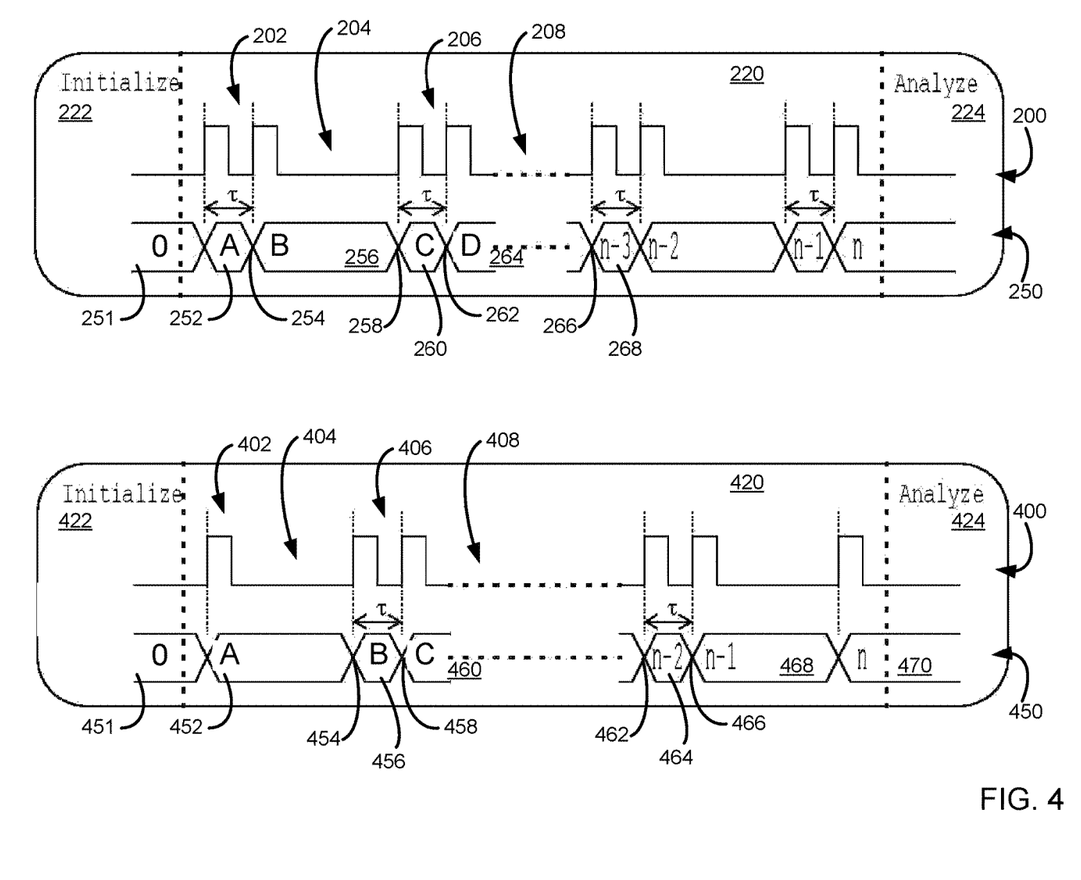
FIG. 4 illustrates a first timing diagrams utilized during an at-speed test of a circuit wafer to test a first portion of the circuit and a second timing diagram to test a second portion of the circuit.

FIG. 4 illustrates a first timing diagrams utilized during an at-speed test of a circuit wafer to test a first portion of the circuit and a second timing diagram to test a second portion of the circuit. In particular, the first timing diagram 220 of FIG. 4 is the clock signal discussed above with relation to FIG. 2 and may be applied during a first portion of a wafer test, such as that described above in the method of FIG. 3. The second timing diagram 420 of FIG. 4 is a clock signal that may be applied during a second portion of the wafer test. Through the application of the first clock signal 220 and the second clock signal 420 during the wafer test, an at-speed test of a circuit may be performed on a wafer in a low current environment.

As discussed above, the clock signal 220 applied during the first portion of the test may test a subset of the logic stages of the circuit at the operational speed of the circuit. Utilizing the example illustrated in FIG. 4, the clock signal 220 tests the transition 254 from logic stage A 252 to logic stage B 256 at-speed, while the transition 258 from logic stage B 256 to logic stage C 260 is not tested at speed due to the delay period 204 of the signal. Similarly, the transition 262 from logic stage C 260 to logic stage D 264 may occur at-speed (in relation to at-speed clock pulses 206) while the next transition would not be at-speed. In this manner, a subset of the transitions of the logic stages of the circuit are tested at-speed.

In a second portion of the test, clock signal 400 may be applied to the circuit by a tester. Clock signal 400 includes a single clock pulse 402 followed by a delay period 404. As shown in the state signal 450 of the timing diagram 420, the single clock pulse 402 and the delay period 404 may transition data in the circuit from logic stage 0 451 to logic stage A 452. Such a transition may not occur at the operational speed of the circuit. Following the delay period 404, the clock signal 400 includes a series of clock pulses 406 followed by another delay period 408. Although the clock pulses 406 shown in diagram 420 include two clock pulses, the series of clock pulses 406 may include any number of at-speed clock pulses. Further, when the clock pulses 406 are applied to the circuit, data transitions 458 from logic stage B 456 to logic stage C 460 at the operational speed of the circuit. The next transition from logic stage C 460 to logic stage D may not be at-speed due to the delay period 408 following the clock pulses 406 of the clock signal 400. The transition from logic stage D to the next logic stage subsequently occurs at-speed. In this manner, alternating logic stages of the circuit design are tested at-speed.

As can be seen in FIG. 4, a first subset of logic stages of the circuit are tested at-speed during the first portion of the wafer test. However, by applying the first single clock pulse 402 in the second portion of the test, the subset of logic stages of the circuit are not tested at-speed in the first portion may then be tested at-speed in the second portion. For example, the transition 254 (logic stage A 252 to logic stage B 256), transition 262 (logic stage C 260 to logic stage D 264), and so on are tested at-speed during the first portion of the test. During the second portion of the test where the second clock signal 400 is applied, transition 458 (logic stage B 456 to logic stage C 460), transition 466 (logic stage n−2 464 to logic stage n−1 468), and so on are tested at-speed through logic stage n 470. Therefore, through executing the first and second portions of the wafer test, each transition through the logic stages of the circuit are performed at-speed such that an at-speed test of the wafer circuit may be accomplished.

Although discussed above as the clock signals 200, 400 including two clock cycles followed by a delay period, any number of clock cycles may be provided to the circuit followed by any number of cycles of delay. In general, the number of clock cycles provided to circuit during the test may be determined based on the available current to apply to the circuit during the test. For example, if more current is available during the wafer test, more consecutive at-speed clock cycles may be applied to the circuit during the test. Less available current reduces the number of consecutive clock cycles that can be applied to operate the circuit during the test. However, the operations described above may also be performed for any number of clock cycles applied during the wafer test.

Figure 5:
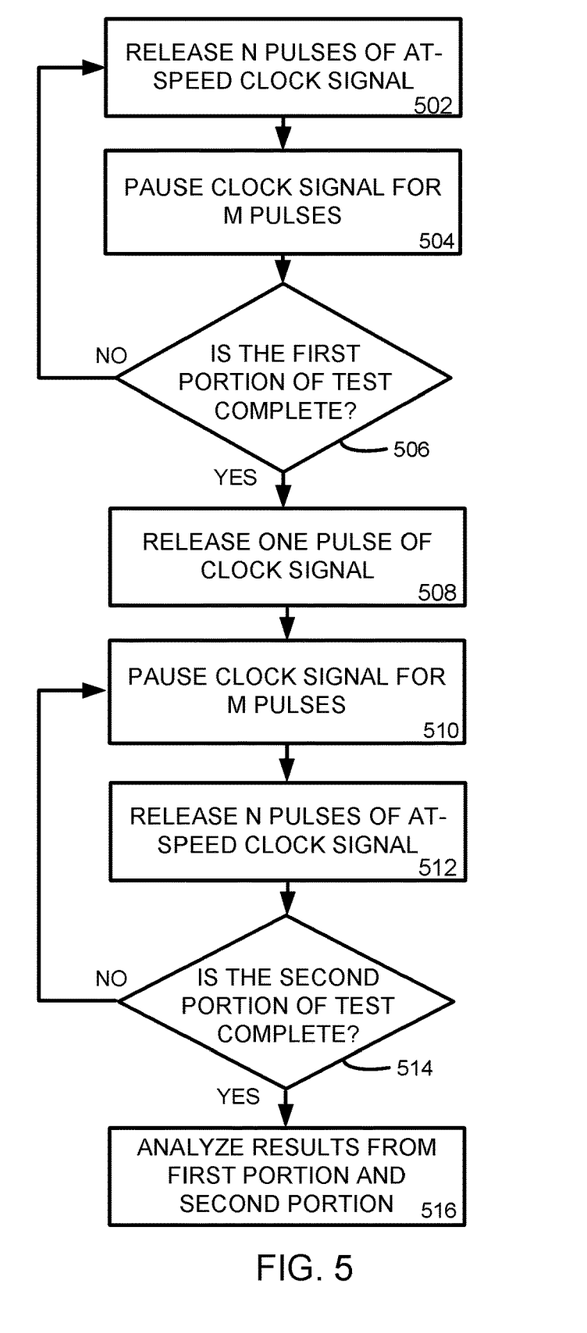
FIG. 5 is a flowchart of a method for providing two clock signals to a circuit wafer under testing to perform an at-speed test of the circuit wafer.

FIG. 5 is a flowchart of a method 500 for providing two clock signals to a circuit wafer under testing to perform an at-speed test of the circuit wafer. The operations of the method 500 may be performed by a tester of a wafer circuit under test. The operations may be executed to generate the clock signals or similar clock signals discussed above to perform the first portion and the second portion of the at-speed test of a circuit embodied on a wafer.

In operation 502, the tester transmits one or more signals to the circuit under test to release n number of pulses of a clock circuit of the circuit under test. The clock pulses may be the same or similar frequency as the operational speed of the circuit. After the n number of clock pulses, the tester transmits one or more additional signals to instruct the clock to stop the release of clock pulses for a delay period in operation 504. The delay period may be the length of m number of the clock pulses. In operation 506, the tester determines if the first portion of the test is completed and, if not, repeats the signals to release n number of clock pulses followed by a delay period for m number of clock pulses.

The tester may determine that the first portion of the test is complete in operation 506 and begin the second portion of the test. After initializing the circuit, the tester transmits one or more instructions to the chip under test to release one clock pulse in operation 508. This one clock pulse corresponds to the single clock pulse 402 of the clock signal 400 of FIG. 4. After the release of the single pulse, the tester transmits one or more additional signals to instruct the clock of the circuit to delay the release of clock pulses for a delay period in operation 510. In one embodiment, the delay period may be the length of m number of clock pulses. In operation 512, the tester transmits one or more instructions to cause the clock signal of the circuit to release n clock pulses. In operation 514, the tester determines if the second portion of the test is completed and, if not, returns to operation 510 to begin the delay period followed by the n number of clock pulses. When the second portion of the test is complete as determined in operation 514, the tester may obtain and analyze the results of the first portion and the second portion of the test in operation 516 to determine the operation of the circuit at or near the operational speed of the circuit. As described above, the first portion and the second portion of the test ensures that each logic stage of the circuit design is tested at-speed.

In general, the clock signals utilized by the tester during the first portion and the second portion of the test are configured such that a first subset of the logic stages of the circuit are tested at-speed by the first portion and a second subset of the logic stages of the circuit are tested at-speed. Further, in one embodiment, the first subset and the second subset comprise all of the logic stages of the circuit design. Thus, many variations of clock signals may be applied to the circuit during the portions of the test. For example, rather than providing for an offset single pulse at the beginning of the test (clock pulse 402 of clock signal 400 of FIG. 4), the clock signals may include any number of an odd number of pulses at the beginning of the clock signal during the second portion. In another example, the length of one or more of the delay periods of the clock signals may be varied by the tester so that the second subset of logic gates are tested at-speed. As such, the number and sequence of clock pulses and delay periods in the clock signals utilized during the first portion and the second portion of the test may vary as desired during the at-speed test of the circuit. In general, the combinations of clock pulses and delay periods may ensure that a first subset of logic stages of the circuit are tested at-speed in the first portion and a second subset of logic stages of the circuit are tested at-speed in the second portion. Through the configuration of the clock signals, the tester may ensure that each stage of the circuit design is tested at-speed such that a more accurate at-speed test result may be obtained in a low current environment.

Figure 6:
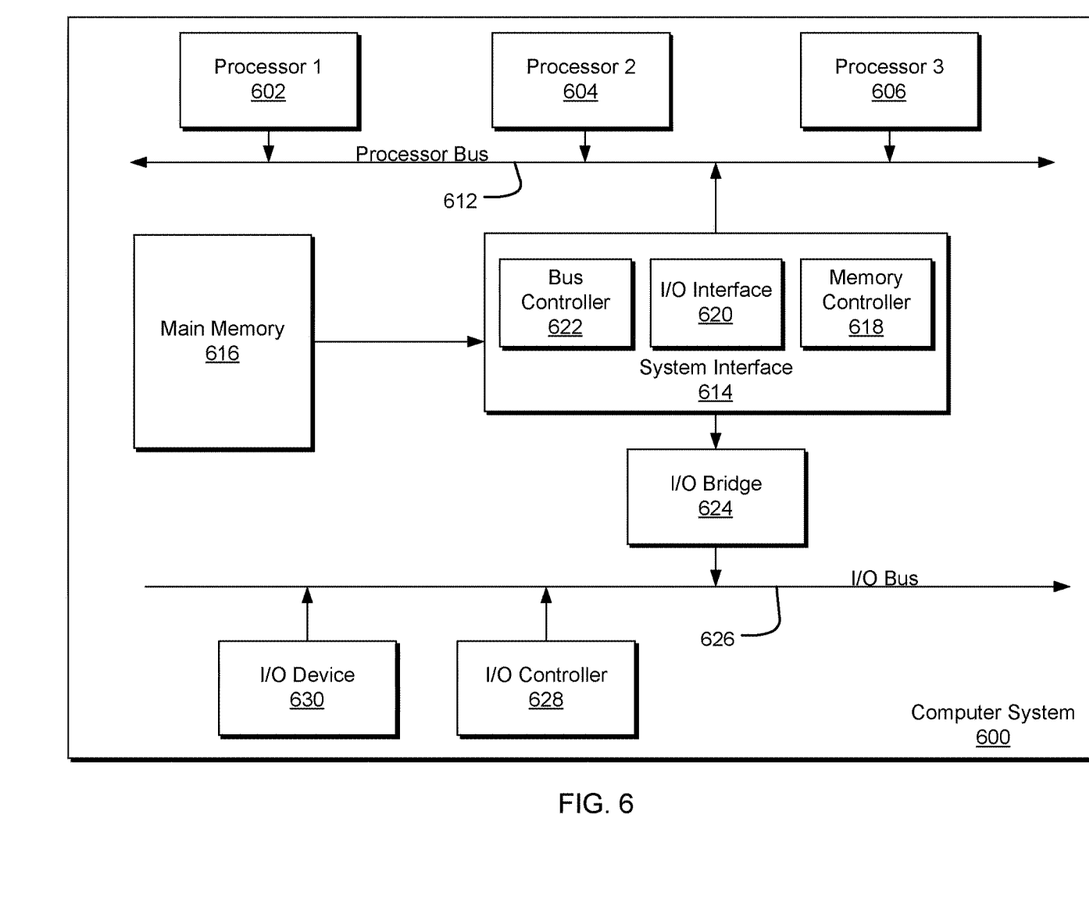
FIG. 6 is a block diagram illustrating an example of a computing system which may be used in implementing embodiments of the present disclosure.

FIG. 6 is a block diagram illustrating an example of a computing device or computer system 600 which may be used in implementing the embodiments of the structural testing schemes of a circuit design disclosed above. For example, the testing device described above for conducting testing on a circuit may be similar to the computing device of FIG. 6. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 3 and 5 are illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for functional testing of a microelectronic circuit, the method comprising:

loading an initial test value into the microelectronic circuit through one or more inputs to the microelectronic circuit, the microelectronic circuit comprising a plurality of logic stages;

conducting a first portion of a functional test by transmitting a first clock signal to the microelectronic circuit, the first clock signal comprising one or more pulses of a first clock signal and one or more first delay periods, the first clock signal configured to test a first subset of the plurality of logic stages at an operational frequency of the microelectronic circuit;

storing a result of the first portion of the functional test in a memory device;

initializing the microelectronic circuit by reloading the initial value into the microelectronic circuit through the one or more inputs;

conducting a second portion of the functional test by transmitting a second clock signal to the microelectronic circuit, the second clock signal comprising at least one offsetting clock pulse, one or more pulses of a second clock signal and one or more second delay periods, the second clock signal configured to test a second subset of the plurality of logic stages at the operational frequency of the microelectronic circuit, the second subset of the plurality of logic stages different than the first subset, the one or more first delay periods of the first clock signal and the one or more second delay periods of the second clock signal causing a charge for one or more components of the microelectronic circuit to replenish; and comparing the stored result from the first portion and a result from the second portion to an expected result.

2. The method of claim 1 wherein the one or more clock pulses of the first clock signal have a first frequency and the one or more clock pulses of the second clock signal have a second frequency, wherein the first frequency and the second frequency are equal to the operational frequency of the microelectronic circuit.

3. The method of claim 2 wherein the one or more clock pulses of the first clock signal and the second clock signal both comprise n clock pulses at the operational frequency of the microelectronic circuit.

4. The method of claim 2 wherein the one or more delay periods of the first clock signal and the second clock signal both comprise no clock pulses for a length of time equal to m clock pulses of the operational frequency of the microelectronic circuit.

5. The method of claim 4 wherein the m clock pulses is more than the n clock pulses.

6. The method of claim 1 wherein a combination of the first subset of the plurality of logic states and the second subset of the plurality of logic states include all of the plurality of logic states of the microelectronic circuit.

7. The method of claim 1 wherein the microelectronic circuit is embodied on a silicon wafer and the first portion of the functional test is conducted by a wafer tester, the wafer tester replenishing the charge by providing a current to the silicon wafer.

8. The method of claim 1 further comprising:
obtaining the result of the first portion of the functional test from the memory device, wherein the expected result is a checksum value and comparing the stored result from the first portion to the expected result comprises determining if the checksum value is equal to the stored result from the first portion of the functional test.

9. The method of claim 8 further comprising:
obtaining the result of the second portion of the functional test; and
comparing the result of the second portion to the expected result to determine if the checksum value is equal to the result of the second portion of the functional test.

10. A computer system comprising:
a testing device for conducting testing of circuit designs; and
a microelectronic circuit embodied on a silicon wafer and coupled to the testing device, the microelectronic circuit comprising a plurality of logic stages;
wherein the testing device electrically connects to the microelectronic circuit and is configured to:
load an initial test value into the microelectronic circuit through one or more inputs to the microelectronic circuit;
initiate a first portion of an at-speed test by transmitting a first clock signal to the microelectronic circuit, the first clock signal comprising one or more pulses of a first clock signal and one or more first delay periods, the first clock signal configured to test a first subset of the plurality of logic stages at an operational frequency of the microelectronic circuit;
store a result of the first portion of the at-speed test in a memory device;
initialize the microelectronic circuit by reloading the initial test value into the microelectronic circuit through the one or more inputs;
conduct a second portion of the at-speed test by transmitting a second clock signal to the microelectronic circuit, the second clock signal comprising at least one offsetting clock pulse, one or more pulses of a second clock signal and one or more second delay periods, the second clock signal configured to test a second subset of the plurality of logic stages at the operational frequency of the microelectronic circuit, the second subset of the plurality of logic stages different than the first subset, the one or more first delay periods of the first clock signal and the one or more second delay periods of the second clock signal causing a charge for one or more components of the microelectronic circuit to replenish; and
compare the stored result from the first portion and a result from the second portion to an expected result.

11. The computer system of claim 10 wherein the one or more clock pulses of the first clock signal have a first frequency and the one or more clock pulses of the second clock signal have a second frequency, wherein the first frequency and the second frequency are equal to the operational frequency of the microelectronic circuit.

12. The computer system of claim 11 wherein the one or more clock pulses of the first clock signal and the second clock signal both comprise n clock pulses at the operational frequency of the microelectronic circuit.

13. The computer system of claim 11 wherein the one or more delay periods of the first clock signal and the second clock signal both comprise no clock pulses for a length of time equal to m clock pulses of the operational frequency of the microelectronic circuit.

14. The computer system of claim 13 wherein the m clock pulses is more than the n clock pulses.

15. The computer system of claim 10 wherein a combination of the first subset of the plurality of logic states and the second subset of the plurality of logic states include all of the plurality of logic states of the microelectronic circuit.

16. The computer system of claim 10 wherein the testing device is a wafer tester configured to provide power to the microelectronic circuit during the first portion and the second portion of the at-speed test, the wafer tester replenishing the charge by providing the power to the silicon wafer.

17. The computer system of claim 10 wherein the testing device is further configured to obtain the result of the first portion of the at-speed test from the memory device, wherein the expected result is a checksum value and comparing the stored result from the first portion to the expected result comprises determining if the checksum value is equal to the stored result from the first portion of the at-speed test.

18. The computer system of claim 17 wherein the testing device is further configured to:
obtaining the result of the second portion of the at-speed test; and
comparing the result of the second portion to the expected result to determine if the checksum value is equal to the result of the second portion of the at-speed test.

* * * * *